US006702296B2

(12) United States Patent
Forry

(10) Patent No.: US 6,702,296 B2
(45) Date of Patent: Mar. 9, 2004

(54) GASKETS WITH SELECTIVELY POSITIONED SEAL ENHANCEMENT ZONES

(75) Inventor: John S. Forry, Lancaster, PA (US)

(73) Assignee: Interface Solutions, Inc., Lancaster, PA (US)

(*) Notice: Subject to any disclaimer, the term of this patent is extended or adjusted under 35 U.S.C. 154(b) by 0 days.

(21) Appl. No.: 09/915,163

(22) Filed: Jul. 25, 2001

(65) Prior Publication Data

US 2002/0084595 A1 Jul. 4, 2002

Related U.S. Application Data

(60) Provisional application No. 60/220,902, filed on Jul. 26, 2000.

(51) Int. Cl.[7] .............................. F02F 11/00; F16J 15/08

(52) U.S. Cl. ........................ 277/592; 277/627; 277/652

(58) Field of Search ................................ 277/592, 596, 277/600, 612, 627, 650, 652, FOR 248

(56) References Cited

U.S. PATENT DOCUMENTS

| | | | |
|---|---|---|---|
| 1,772,173 A | 8/1930 | Yates | |
| 2,070,918 A | 2/1937 | Peterson et al. | |
| 2,289,620 A | 7/1942 | Bernstein | |
| 2,681,241 A | 6/1954 | Aukers | |
| 3,353,666 A | 11/1967 | Jensen | |
| 3,355,181 A | 11/1967 | Olson | |
| 3,606,360 A | 9/1971 | Barker | 277/166 |
| 3,655,210 A | 4/1972 | Farnam et al. | |
| 3,661,401 A | 5/1972 | Farnam | |
| 3,729,205 A | 4/1973 | Kwok | |
| 3,785,856 A | 1/1974 | Gotoh | |
| 3,837,657 A | 9/1974 | Farnam et al. | |
| 3,890,183 A | 6/1975 | Farnam | |
| 3,970,322 A | 7/1976 | Stecher et al. | |
| 4,103,913 A | 8/1978 | McDowell | |
| 4,272,085 A | 6/1981 | Fujikawa et al. | |
| 4,300,779 A | 11/1981 | DeCore et al. | |
| 4,431,197 A | 2/1984 | Kirkland | |
| 4,434,989 A | 3/1984 | Beyer et al. | |
| 4,499,135 A | 2/1985 | Mitchell et al. | |
| 4,548,165 A | 10/1985 | Vorobiev et al. | |
| 4,600,201 A | 7/1986 | Lonne et al. | |
| 4,601,476 A | 7/1986 | Usher et al. | |
| 4,635,949 A | 1/1987 | Lucas et al. | |
| 4,691,928 A | 9/1987 | Abele | |

(List continued on next page.)

FOREIGN PATENT DOCUMENTS

| | | |
|---|---|---|
| DE | 29 31 217 | 1/1980 |
| DE | 85 20 709.8 | 11/1985 |
| DE | 3433376 A1 | 3/1986 |
| DE | 86 24 855.3 | 12/1987 |
| DE | 37 11 664 A1 | 10/1988 |
| DE | 37 19 189 A1 | 12/1988 |
| DE | 3903918 A1 | 8/1990 |

(List continued on next page.)

*Primary Examiner*—Anthony Knight
*Assistant Examiner*—Vishal Patel
(74) *Attorney, Agent, or Firm*—Womble Carlyle Sandridge & Rice, PLLC

(57) ABSTRACT

A gasket with selectively positioned seal enhancement zones located in the web of the gasket is provided. The gasket is formed of a base sheet of gasket material cut to define an interior aperture bounded by an interior edge and webs. Slots are formed at selected locations within the seal enhancement zones and the slots are bounded by edges. An edge coating of polymeric material is applied to the slot edges and, in one embodiment, project beyond the facial planes of the base sheet to form raised rims. An edge coating also may be formed on the interior edge bounding the aperture of the gasket. When clamped between a pair of flange surfaces, the polymeric edge coatings on the slot edges engage and seal against the flange surfaces within the seal enhancement zones to provide an enhanced seal against leakage in these zones.

22 Claims, 4 Drawing Sheets

U.S. PATENT DOCUMENTS

| | | | |
|---|---|---|---|
| 4,741,965 A | 5/1988 | Zerfass et al. | |
| 4,743,421 A | 5/1988 | McDowell et al. | |
| 4,746,130 A | 5/1988 | Abele | |
| 4,795,166 A | 1/1989 | Irmler | |
| 4,932,673 A | 6/1990 | Domnikov et al. | |
| 5,033,756 A | 7/1991 | Sixsmith et al. | |
| 5,082,297 A | 1/1992 | Flasher | |
| 5,112,664 A | 5/1992 | Waterland, III | |
| 5,145,190 A | 9/1992 | Boardman | |
| 5,150,910 A | 9/1992 | Udagawa | |
| 5,180,631 A | 1/1993 | Amano | |
| 5,194,696 A | 3/1993 | Read | |
| 5,240,766 A | 8/1993 | Foster | |
| 5,286,574 A | 2/1994 | Foster | |
| 5,437,767 A | 8/1995 | Halout et al. | |
| 5,518,257 A | 5/1996 | Breaker | |
| 5,534,295 A | 7/1996 | Schlichter et al. | .......... 427/284 |
| 5,536,565 A | 7/1996 | Halout et al. | |
| 5,540,566 A | 7/1996 | Ishizaki et al. | |
| 5,667,227 A | 9/1997 | Boldt | |
| 5,700,017 A | 12/1997 | Tensor | |
| 6,093,467 A | 7/2000 | Forry | |

FOREIGN PATENT DOCUMENTS

| | | | |
|---|---|---|---|
| DE | 41 16 822 A1 | 11/1992 | |
| DE | 42 11 076 A1 | 10/1993 | |
| DE | 44 17 840 A1 | 11/1995 | |
| EP | 0 041 906 | 12/1981 | |
| EP | 0 177 709 | 4/1986 | |
| EP | 0 179 995 | 4/1986 | |
| EP | 0 202 909 | 11/1986 | |
| EP | 0 487 369 A1 | 5/1992 | |
| EP | 0 499 551 a1 | 8/1992 | |
| EP | 0 790 428 A1 | 8/1997 | |
| EP | 0 889 489 A1 | 3/1999 | |
| EP | 0 899 488 A1 | 3/1999 | |
| EP | 0964189 | 12/1999 | ........... F16J/15/10 |
| GB | 1087616 | 10/1967 | |
| GB | 1 357 586 | 6/1974 | |
| GB | 2 019 507 A | 10/1979 | |
| GB | 2019507 A | 10/1979 | |
| GB | 2 091 824 A | 8/1982 | |
| GB | 2 163 496 A | 2/1986 | |
| GB | 2 328 724 A | 3/1999 | |
| GB | 2 328 725 A | 3/1999 | |
| GB | 2 330 182 A | 4/1999 | |

GASKETS WITH SELECTIVELY POSITIONED SEAL ENHANCEMENT ZONES

REFERENCE TO RELATED APPLICATIONS

The benefit of the filing date of U.S. provisional patent application serial No. 60/220,902, filed Jul. 26, 2000, is hereby claimed pursuant to 35 U.S.C. §119. The present invention also is related to the invention disclosed in pending U.S. patent application Ser. No. 09/519,653 filed Mar. 6, 2000, (the "incorporated disclosure"), the entire disclosure of which is hereby incorporated as if fully set forth herein.

TECHNICAL FIELD

This invention relates generally to gaskets and more specifically to gaskets with seal enhancement zones positioned at selected locations within a web or webs of the gasket.

BACKGROUND

A typical gasket for use in, for example, internal combustion engines comprises a base sheet that is die cut from gasket material and has one or more internal apertures surrounded by a web or webs of the gasket. As described in substantial detail in the incorporated U.S. patent application, an enhanced seal can be achieved in gaskets by forming a polymer coating on the cut interior edges that surround and bound the interior apertures of the gasket. These edge coatings can take on a variety of configurations including edge-wrapped and non edge-wrapped coatings, coatings that define raised lips surrounding internal apertures, and even coatings on exterior edges of the gaskets. Such gaskets generally are referred to herein as "edge-coated gaskets."

While edge-coated gaskets form an improved seal as compared to traditional gaskets in a wide variety of gasketing situations, there are nevertheless some cases in which an improved seal may not be required or desired around the entire surrounding edge of a gasket aperture. For example, an adequate seal may exist with no edge coating at all in regions adjacent to bolt holes where clamping pressures on a gasket are high, while an enhanced seal still may be needed in other regions spaced from bolt holes where clamping pressures can be significantly lower. In other cases, a coating on the interior edge of a gasket may not be feasible, such as, for instance, in gaskets with relatively narrow webs. Nevertheless, an enhanced seal in certain regions of the gasket still may be needed. In still other cases, a gasket with an edge coating surrounding an interior aperture may nevertheless require an enhanced seal in other selected regions of the gasket, such as in regions of the gasket's web between widely spaced bolt holes. In these and other cases, aperture only edge-coated gaskets such as those disclosed in the incorporated disclosure are not always optimal.

In the past, attempts to provide an enhanced seal within selected regions or zones of a gasket web have included simply applying a bead of a rubber or polymer based sealant to the surface of the gasket web. The theory is that when the gasket is clamped between a pair of flanges, the bead of sealant will be compressed between the gasket web and a flange to provide an enhanced seal within the region of the gasket where the bead is located. While such solutions can be somewhat successful, they nevertheless have certain inherent problems and shortcomings. For instance, beads of sealant applied to a gasket's surface increase the effective thickness of the gasket in the region of the bead. This can result in less than optimal distribution of clamping forces when the gasket is clamped between a pair of flanges, which can degrade rather than enhance the resulting seal. Further, surface applied sealant beads generally have not been proven to provide a completely satisfactory barrier against interfacial migration of fluid across the web faces of the gasket.

Thus, a need exists for a gasket that provides an enhanced seal in selected regions or zones where additional sealing is required without the problems and shortcomings inherent in surface sealant beads and other methods used in the past to provide such selectively positioned seal enhancement zones. It is to the provision of such a gasket and a unique method of forming the gasket that the present invention is primarily directed.

SUMMARY OF THE INVENTION

Briefly described, the present invention, in a configuration that is simplified for clarity of discussion, comprises a generally rectangular gasket characterized by a single interior aperture surrounded by a web of gasket material having a predetermined width. The interior edge that bounds the aperture of the gasket may or may not be provided with a polymer edge coating as described in the incorporated disclosure, or, alternatively, only portions of the interior edge may be coated. Seal enhancement zones are strategically located in selected regions within the web of the gasket such as, for instance, in regions between widely spaced bolt holes where an enhanced seal is needed. Within each seal enhancement zone, a relatively narrow slot is cut in the web where an enhanced seal is desired. The position of the slot may correspond, for example, to the position where a bead of sealant would be applied to the surface of the gasket in the prior art methods discussed above. The cut edges that bound the slot are then coated with a polymer edge coating in the manner described in the incorporated disclosure with the edge coating preferably defining raised lips that rim the slot. In any event, when the gasket is clamped between a pair of flanges, the polymer edge coating of the slot is compressed to provide a reliable enhanced seal along the length of the slot within the seal enhancement zone. Because the polymer edge seal surrounds the slot, the polymer material itself is able to bulge or deform into the slot rather than being flattened or smashed between the flange and the surface of the gasket web when the gasket is clamped in place. Thus, an enhanced seal is provided within the seal enhancement zone without affecting the distribution of clamping forces on the gasket. Further, since the polymer coating on the edges of the slot is compressed rather than smashed, an improved, more reliable, and more permanent seal is created at the location of the seal enhancement zone.

The gasket base sheet in the present invention may be formed of any suitable gasket material, such as a fibrous porous gasket material, that is die or otherwise cut to form a desired gasket shape. The edge coating that lines each slot in the seal enhancement zone may take on any of a variety of configurations including a wrapped edge coating, a coating that defines raised rims, or a variety of others as dictated by application-specific sealing requirements. The polymer material of the edge coating preferably intrudes or penetrates a predetermined distance into the porous material of the gasket base sheet to form an intrusion zone that seals against interstitial leakage and that binds the edge coating securely to the edge of the slot. Gaskets according to the present invention may include a plurality of seal enhancement zones selectively positioned and configured within any region of the gasket where an enhanced seal is desired.

The present invention also is directed to methods of making gaskets having one or more seal enhancement zones.

One embodiment of the method includes the steps of providing a plurality of base sheets each having opposed faces and a slot bounded by an edge located in a seal enhancement zone, stacking the plurality of base sheets together with their slots aligned to define the walls of a narrow cavity, contacting the walls of the cavity with a coating material to deposit a layer of coating material on the aligned slot edges, and separating individual base sheets from the stack to form edge-coated slots with raised rims. The coating material may be applied to the cavity walls in a variety of ways, some of which are set forth herein. The present invention also includes a gasket formed by such a process.

The invention further includes an engine incorporating one or more gaskets with edge-coated slots located in selected seal enhancement zones. Such an engine may include a block with at least one fluid conduit formed therein that is sealed at a junction by a gasket having selectively positioned seal enhancement zones.

Thus, an improved gasket with selectively positioned seal enhancement zones is now provided. The gasket offers strategically positioned enhanced seals in situations where gaskets having only edge-coated internal apertures, such as those of the incorporated disclosure, may not be desirable or feasible, and also in situations where such gaskets are employed but an enhanced seal in selected regions is nevertheless desired. The provision of an enhanced seal in pre-selected zones or regions of a traditional non edge-coated gasket also is accommodated. These and other features, objects, and advantages of the invention will become more apparent upon review of the detailed description set forth below when taken in conjunction with the accompanying drawing figures, which are briefly described as follows.

DETAILED DESCRIPTION OF THE PREFERRED EMBODIMENT

Figure 1:
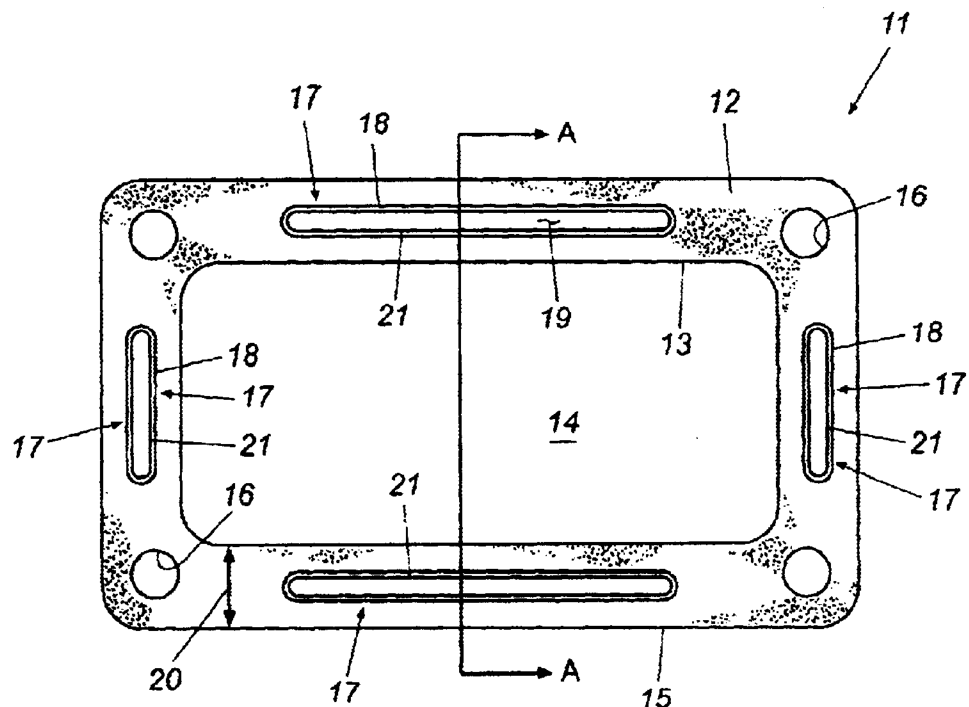
FIG. 1 is a top plan view of a gasket with selectively positioned seal enhancement zones that embodies principles of the present invention in a preferred form.

Referring now in more detail to the drawings, in which like numerals refer to like parts throughout the several views, FIG. 1 illustrates a gasket that embodies principles of the present invention in one preferred form. The gasket in FIG. 1 is illustrated with a simple rectangular shape and a single internal aperture for clarity of description. It will be understood, however, that the gasket may, and for actual use likely will, take on any of a variety of convolute shapes depending upon the application for which the gasket is intended. Thus, the invention is not limited by the simple gasket shape of the drawing figures, but may be incorporated into a gasket of virtually any configuration.

The gasket 11 includes a base sheet 12, which, in the illustrated embodiment, is made of a porous gasket material, but may be made from other types of gasket materials such as, for example, laminated, rubberized, or metal core gasket materials. The base sheet 12 is die-cut or otherwise formed to define an interior aperture 14 that is bounded by an interior edge 13. Bolt holes 16 are punched in the gasket to accommodate bolts that clamp the gasket 11 between a pair of flanges or other mating surfaces to create a seal. The gasket also has an exterior edge 15 that extends around the outside periphery of the gasket. The webs of the gasket have a predetermined web width, indicated by numeral 20 in the illustrated embodiment.

Seal enhancement zones 17 are strategically located in selected regions of the gasket webs and, in the illustrated embodiment, are positioned in regions between the bolt holes 16. It will be appreciated, however, that the seal enhancement zones may be located in any region of the gasket web where enhanced sealability is required or desired.

A relatively narrow slot 19 bounded by a slot edge 18 is cut or otherwise formed within the seal enhancement zones 17 of the gasket web. An edge coating 21 is applied to the edge 18 of each slot 19 in the manner described in the incorporated disclosure and summarized below. The edge coating 21 may include at least one polymeric material and may, for example, be selected from a group including acrylics, acrylonitriles, fluorcarbons, styrene butadienes, polyvinyl chlorides, chloroprenes, ethylene propylenes, ethylene/vinyl acetates, epoxides, fluorosilicones, polyurethanes, silicones and copolymers and mixtures thereof, as well as other suitable polymers. The edge coating 21 engages and seals against a pair of flange surfaces between which the gasket is clamped to provide an enhanced seal in the vicinity of the respective seal enhancement zones 17.

In the illustrated embodiment, the seal enhancement zones 17 are located in the regions of the gasket webs intermediate the bolt holes 16. Such a positioning may be selected where, for example, it is determined that a good seal is provided by the gasket in the vicinity of the bolt holes 16 as a result of the substantially higher clamping pressures applied by the bolts in these regions. However, clamping pressures can be significantly lower in regions between the bolt holes 16 as a result, for example, of flange warp or lack of web stiffness. In such a case, an enhanced seal is needed only in the regions between the bolt holes 16 and the gasket configuration of FIG. 1 provides an enhanced seal only in those regions. Thus, it may be said that the gasket 11 is provided with selectively positioned seal enhancement zones. In reality, of course, the slots 19 may not be simple straight and narrow openings as illustrated but can be any shape and size and further can be positioned at any location on the gasket where an enhanced seal is needed. Thus, the word "slot" as used herein and in the claims hereof should be understood to mean an opening of any configuration and size formed within a seal enhancement zone of a gasket. Furthermore, while the edge coating 21 illustrated in FIG. 1 extends only slightly into the slot 19, the invention also contemplates and includes within its scope an edge coating 21 that substantially fills the slot, i.e. wherein most or all of the slot is filled with the coating material.

Unlike the aperture-only edge-coated gaskets of the incorporated disclosure, the slot edge coatings 21 in the present invention do not, during normal use, face and contact the fluids that contact the edges of the internal aperture 14 of the gasket. Instead, the slot edge coatings 21 form within the seal enhancement zones a double seal against both interfacial leakage of fluid at the mid-web location and also interstitial leakage beyond the location of seal enhancement zones 17. Thus, the gasket of the present invention also provides an exceptional seal against both types of leakage with the added advantage that the seal enhancement zones 17 can be positioned anywhere on the gasket 11 where they are needed.

Figure 2:
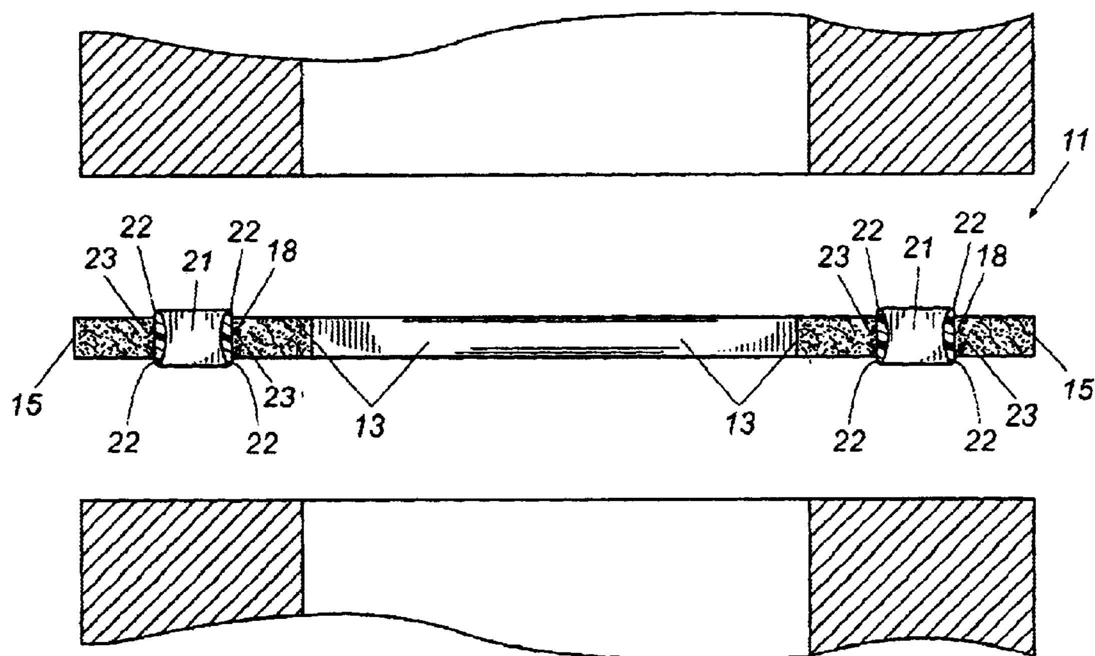
FIG. 2 is a cross-sectional view of the gasket of FIG. 1 taken along A—A thereof illustrating one possible configuration of the seal enhancement zone slots and their associated edge coatings.

FIG. 2 is a cross-sectional view of the gasket of FIG. 1 taken along line A—A thereof and showing one embodiment of an edge coating on a seal enhancement zone slot according to the invention. The gasket 11 has an interior edge 13, uncoated in this embodiment, which surrounds and defines the aperture of the gasket. Slots 19 (FIG. 1) are formed in the seal enhancement zones and are defined and bounded by edges 18. An edge coating 21 is applied to the slot edges 18 as previously described. In the illustrated embodiment, the edge coatings 21 form raised rims 22, which project beyond the facial planes of the base sheet a predetermined distance. Further, the edge coating material penetrates a predetermined distance into the porous material of the base sheet to form intrusion zones 23. The intrusion zones 23 provide all of the advantages discussed in the incorporated disclosure, including sealing the edge against interstitial migration of fluid and securing the edge coating 21 firmly and permanently to the slot edge 18.

Figure 3:
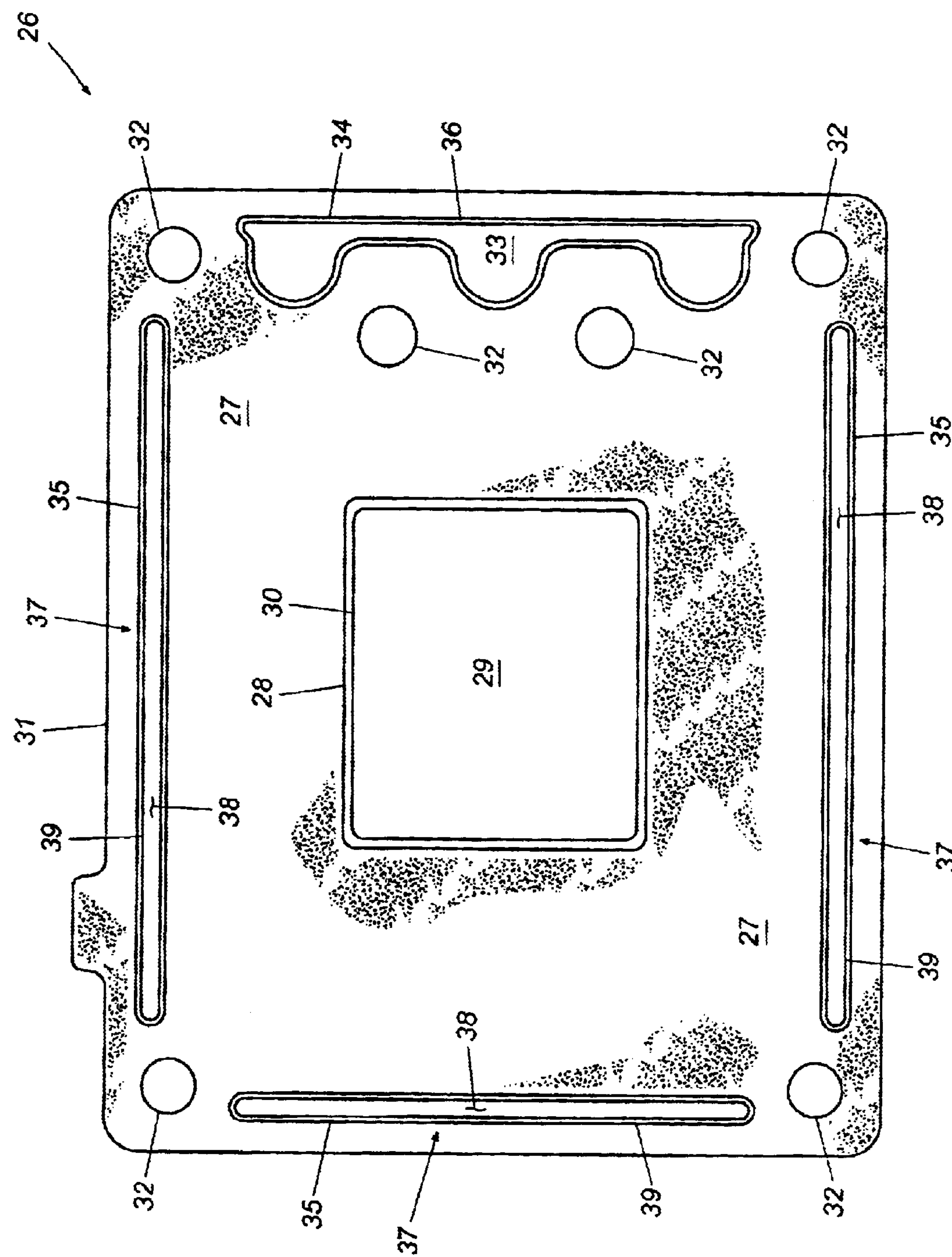
FIG. 3 is a top plan view of a gasket that embodies principles of the present invention in an alternate form.

FIG. 3 is a top plan view of a possible production gasket that embodies principles of the present invention. The gasket 26 comprises a base sheet 27 of gasket material, which preferably, but not necessarily, is a porous gasket sheet material. The base sheet 27 is formed with a first interior edge 28 that surrounds and defines a central aperture 29 and a second interior edge 34 that surrounds and defines a perimeter aperture 33 of the gasket. The central aperture 29 and perimeter aperture 33 in this particular gasket correspond to fluid conduits that are to be sealed by the gasket. Optionally, an edge coating 30 may be applied around the first interior edge 28 according to the incorporated disclosure to form an edge seal. Similarly, an optional edge coating 36 may be applied around the second interior edge 34 to form an edge seal around the perimeter aperture 33. Bolt holes 32 are judiciously located around the base sheet for accommodating bolts that hold a pair of mating flanges together and that are tightened to compress the gasket 26 between the flanges.

Seal enhancement zones 37 are strategically located between the bolt holes 32 within the webs of the gasket 26. A narrow slot 38 is cut within the seal enhancement zones of the web where an enhanced seal is desired. Each of the slots 38 is defined and surrounded by an edge 35 and an edge coating 39 is applied according to the invention to each slot edge 35. Preferably, but optionally, the edge coating 39 projects beyond the facial planes of the base sheet 27 to form raised rims extending around the slots 38. As with the previous embodiment, the edge coated slots within the seal enhancement zones 37 form a double seal against interfacial leakage of fluid at the mid-web location and also seal against interstitial leakage past the slots. The primary apertures of the gasket in FIG. 3 also are provided with edge coatings according to the invention for a seal of even greater integrity. It thus will be seen that the invention includes and encompasses both gaskets having seal enhancement zones and no aperture edge coatings, as well as gaskets having both seal enhancement zones and aperture edge coatings.

Gaskets of the present invention, and particularly the edge coated slots within the seal enhancement zones thereof, may be formed by any of the "stack-and-coat" processes discussed in detail in the incorporated disclosure and summarized below including, without limitation, "stack-and-rotate," "stack-and-fill," "stack-and-spray," and "stack-and-wipe." Further, as shown in FIG. 3, these processes may be applied simultaneously to create gaskets with both interior edge coatings surrounding gasket apertures and edge coated slots in selectively positioned seal enhancement zones to provide targeted seal enhancement in selected regions of the gasket. Additionally, while the slot edge coating 21 in the illustrated embodiment is shown as a simple edge coating with projecting rims, the edge coating itself may take on any of a variety of configurations as discussed in the incorporated disclosure, including an edge-wrapped coating. The invention is intended to encompass all such configurations. These and many other additions, deletions, and modifications of the illustrated embodiments may well be conceived and applied by those of skill in the art within the scope of the invention.

Figure 4:
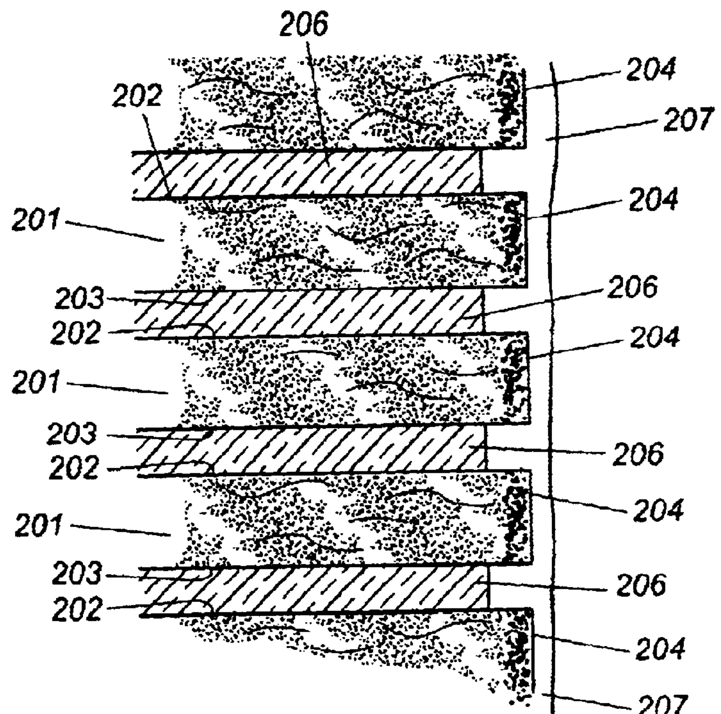
FIG. 4 is a cross-sectional view illustrating one embodiment of a "stack-and-coat" manufacturing process by which the edge-coated seal enhancement zone slots of the invention may be produced.
Figure 5:
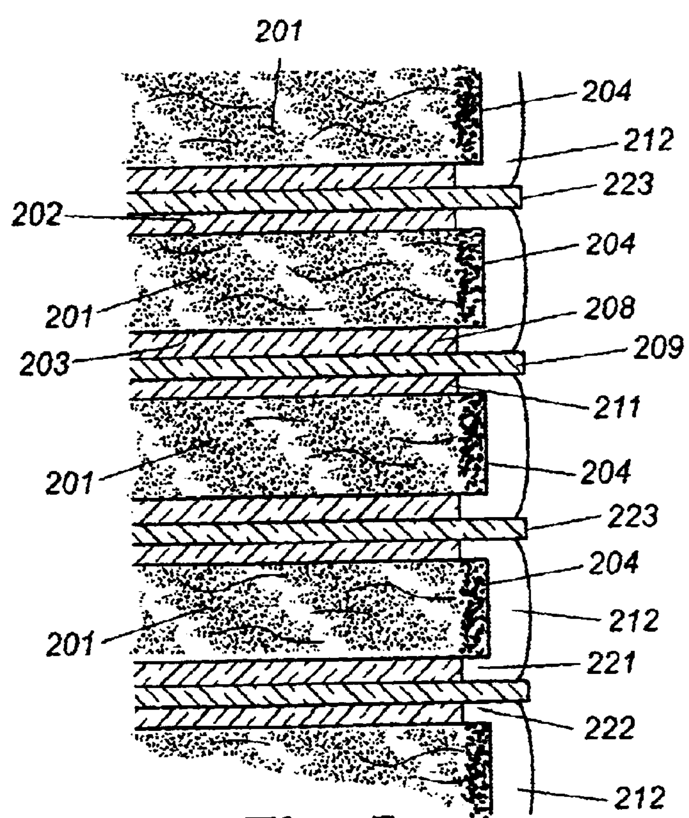
FIG. 5 is a cross-sectional view illustrating another embodiment of the "stack-and-coat" process.
Figure 6:
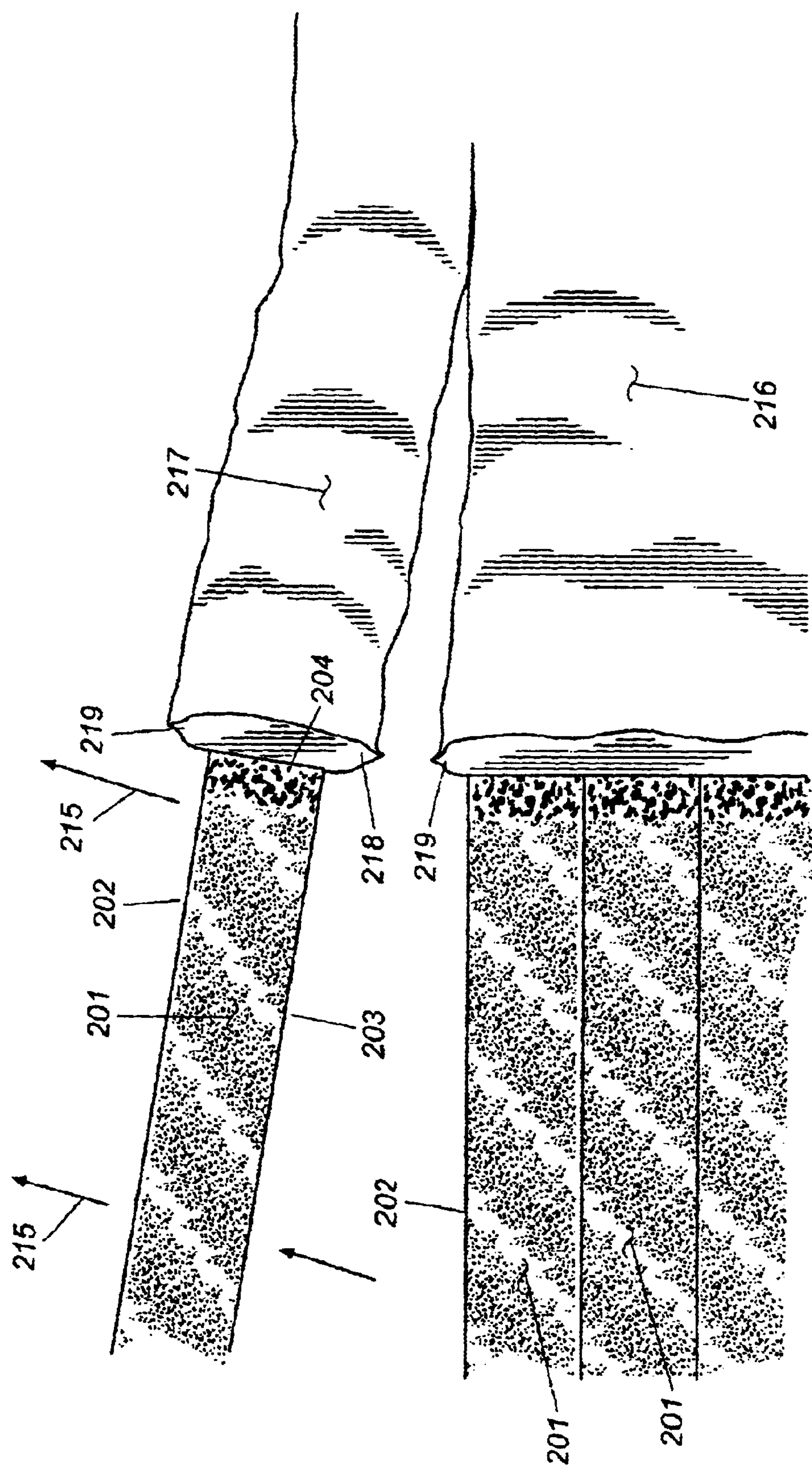
FIG. 6 is a cross-sectional view of yet another embodiment of the "stack-and-coat" process of the invention showing the formation of projecting rims by peeling individual gaskets from a gasket stack.

FIGS. 4 through 6 illustrate a methodology for fabricating gaskets that embody edge-coated slots within seal enhancement zones according to the present invention. The method generally is referred to herein as a "stack-and-coat" process and will be described in terms of specific embodiments and methodologies, although the invention is not limited to these particular exemplary embodiments. Generally, the stack-and-coat process comprises stacking a plurality of gasket base sheets together in a stack with the base sheets being aligned with each other. When so stacked, the edges of the slots in the seal enhancement zones align with each other to form a narrow cavity. The cavity has a peripheral contour corresponding to the shape of the individual slots of the seal enhancement zones and a depth determined by the number of gaskets stacked together.

In one preferred methodology referred to as a "stack-and-rotate" process, the gaskets are stacked atop a base, which may be made of Plexiglas™ or other machinable material. The base is pre-machined to define a relatively shallow well having the size and contour of the seal enhancement zone slots and the gaskets are positioned on the base so that the well is aligned with the cavity formed by the slots. The base thus closes off one end of the cavity and the floor of the shallow well defines the bottom of the cavity. The well is filled or at least partially filled with an edge coating material, such as one of the polymeric materials identified above, in liquid form. The cavity is then closed off at its top end by, for example, clamping the entire gasket stack and base securely between a pair of heavy metal plates, which compresses the gasket base sheets together tightly and seals off the open end of the cavity formed by the aligned slots in the seal enhancement zones.

With liquid polymer in the well and the cavity sealed between the metal plates, the entire assembly is tilted up on edge at a predetermined rate of tilt. This causes the liquid polymer to flow out of the well and onto the wall of the cavity formed by the aligned edges of the slots. The rate of tilt is selected to insure even flow of polymer onto the slot edges and to prevent splashing or agitation of the polymer that might entrain air bubbles. While the optimum tilt rate for a particular situation is highly dependent upon factors such as the coating rheology, its viscosity, the base sheet material, and the complexity of the slot shape, it has been found generally that tilt rates of less than about 3 to 4 degrees per second are acceptable for most applications.

When the stack has been tilted onto its edge, it is rotated about an axis perpendicular to the cavity at a predetermined relatively slow rotation rate and through a predetermined number of rotations. During each complete rotation, the liquid polymer or other coating material flows under the influence of gravity completely around the interior wall of the narrow cavity formed by the aligned slots. In this way, the polymer is progressively deposited and builds up on the slot edges and also penetrates a short distance into the porous edges thereby forming intrusion zones 23 (FIG. 2). The rate of rotation of the stacked gaskets is selected to insure that the coating material flows evenly around the cavity, that it flows completely into any crevices formed by the profile of the slots, and that the coating material penetrates the porous edges of the slots. Again, while the optimum rotation rate is dictated by many factors, it has been found generally that rotation rates from about 0.5 rotations per minute (rpm) to about 30 rpm are acceptable in many situations. Rotation rates outside this range also may be selected.

When the coating material has built up on the walls of the slots to a predetermined thickness, rotation is discontinued and the assembly is tilted back down to allow excess coating material to flow back into the shallow well formed in the base. After excess coating material has drained away, a stack of gasket base sheets with a continuous coating of polymer covering the walls of the cavity formed by the aligned slots is formed.

Other methodologies of coating the walls of the narrow cavity have been used and each can be as acceptable as the stack-and-rotate methodology described above. These alternative methodologies will not be described in detail, but, in general, they include a "stack-and-fill" process, a "stack-and-spray" process, a "stack-and-wipe" process and a "stack-and-flame spray" process. In the "stack-and-fill" process, the cavity (or cavities) formed by the aligned slots within the seal enhancement zones of a stack of gaskets is filled with coating material in liquid form, which is left to set for a predetermined time. The coating material is then poured out of the cavity, leaving behind a continuous coating covering walls of the cavity. In the "stack-and-spray" process, the coating material is sprayed onto the walls of the cavity formed by the aligned slot edges of a stack of gaskets, again resulting in a continuous coating. In the "stack-and-wipe" process, the coating material is applied to the exposed slot edges using an appropriate tool such as a small squeegee or other applicator. Finally, in the "stack-and-flame spray" process, the coating material is caused to coagulate onto the exposed slot edges through a flame spraying process. The result of each of these methodologies is similar: a continuous coating on the aligned slot edges of the stacked gaskets.

With a continuous coating covering the aligned slot edges of the stacked gaskets, the stack is removed from the coating apparatus and the edge coating material is allowed to thicken partially but not completely such that it retains a degree of malleability. With the coating material partially thickened and malleable, each individual gasket is peeled off of the stack of gaskets. The peeling process causes the coating material on the slot edges of each gasket to be torn from the continuous coating on the walls of the cavity formed by the remaining gaskets. An edge coating on each gasket that is torn away is thus formed. Further, and significantly, since the edge coating material in most applications is only partially thickened and still malleable, the tearing-away process stretches the edge coating material and elongates it to form the raised rims of the edge coating that protrude beyond the facial planes of the torn away gasket. By judiciously selecting coating material rheology, material build up, and partial thickening or dwell times in conjunction with the use of various types of spacers in the gasket stack, a wide variety of slot edge coating configurations, many of which are illustrated in the incorporated disclosure, can be formed.

When the individual edge-coated gaskets have been peeled from the stack, the thickening of the edge coating material is completed to set the shape and final properties of the edge coating. In the case of polymeric edge coatings, the final thickening may be accomplished by moving the gaskets through a curing oven to accelerate the curing, i.e. the cross-linking, of the polymer. For other types of coating materials where drying is the mechanism by which thickening occurs, ovens may also be used to accelerate the evaporation of solvents from the coating material to complete the thickening thereof.

FIG. 6 illustrates the peeling process discussed above for creating gaskets with edge-coated seal enhancement zone slots having projecting rims that protrude beyond the facial planes of the gasket. Here, a plurality of gasket base sheets 201 are seen to be stacked together with their slot edges aligned to define the walls of the cavity. Only one edge of the narrow cavity formed by the aligned slots is illustrated in FIG. 6 for clarity of illustration and discussion, but it will be understood that the discussion applies to the adjacent edge of the slot as well. In this figure, the stack previously has undergone one of the coating processes discussed above such that a continuous coating 216 of edge coating material covers the exposed slot edges of the stacked gaskets to a predetermined depth. Further, the material of the coating 216, which may be a polymeric material, is partially, but not completely, thickened such that it retains a measure of malleability. The top gasket of the stack is shown being peeled off of the stack in the general direction of arrows 215 to separate it from the remaining gaskets in the stack.

As the top gasket is peeled away, the edge coating material on its slot edge 204 is progressively torn from the continuous coating 216, forming edge coating 217 extending around the seal enhancement zone slot of the torn-away gasket. Since the edge coating material is still malleable, the tearing process stretches and deforms the coating material along the line of the tear to form a rim 218 that protrudes beyond the facial plane of the base sheet. The corresponding torn edge remaining on the stack also is stretched during the tearing process as indicated at 219. The result for each gasket peeled away is an edge coating (or several edge coatings depending on the number of seal enhancement zones that are present) having a pair of opposed projecting rims 218 and 219 that extend around the seal enhancement zone slots of the gasket. Thickening of the individual edge coatings is then accomplished by curing or drying as discussed above to set the shape and elastic properties of the edge coatings. Edge coating configurations, such as those illustrated in the incorporated disclosure, may be made using the process illustrated in FIG. 6.

FIG. 4 illustrates another embodiment of the stack and coat process referred to herein as the "mold-in-place" process. In this embodiment, gasket base sheets 201 are again stacked with their seal enhancement zone slot edges 204 aligned with each other. However, in this embodiment, spacers 206 are disposed between each pair of base sheets 201 in the stack. The spacers 206, which preferably are made of a non-stick material such as nylon or Teflon™, have shapes corresponding to the shape of the gaskets and are formed with slots that align with and have the same shape as the slots of the base sheets, but that are slightly larger. The interior edges of the spacers 206 are thus recessed with respect to the aligned zone slot edges. FIG. 4 illustrates the stack as it appears after having been coated with edge coating material 207 such as, for example, a polymer coating. The edge coating material 207 covers and penetrates the slot edges 204 of the base sheets to form intrusion zones and also extends into the recessed space created by a spacer between each of the base sheets. It will thus be seen that the edge coating material wraps around partially onto the faces 202 and 203 of each base sheet to form face coatings that extend in strips around the seal enhancement zone slots of the gaskets.

Just as in the embodiment of FIG. 6, the gaskets 201 in the mold-in-place process of FIG. 4 may be peeled away from the stack one at a time when the edge coating material is partially thickened and still malleable. This causes the edge coating material to tear and to stretch and deform in the regions of the recesses between the gaskets to form edge and face coatings with projecting rims that protrude beyond the facial planes of the gaskets. The thickening is then completed in a curing oven or otherwise to set the final shape and properties of the edge coatings.

FIG. 5 illustrates yet another mold-in-place process for manufacturing gaskets with edge-coated slots in seal enhancement zones. In this embodiment, gasket base sheets 201 are stacked with their slot edges 204 aligned with each other. A set of stacked spacers 208, 209, and 211 are disposed between each pair of base sheets. Spacers 208 and 211 are disposed against the base sheets and have slots that are slightly larger than the slots of the base sheets to define recesses 221 and 222. Spacer 209 is sandwiched between spacers 208 and 211 and is formed with an aperture that is slightly smaller than the seal enhancement zone slots of the base sheets such that spacers 209 extend to an edge that projects beyond the aligned slot edges 204 of the base sheets.

The stacked assembly in FIG. 5 is shown as it appears after the application of edge coating material through one of the processes described above or otherwise. It can be seen that edge coating material has flowed onto the slot edges 204 of each of the gasket base sheets and has penetrated the pores thereof to form intrusion zones. Edge coating material also has flowed into the recesses 221 and 222 formed by the spacers 208, 209, and 211 to form wrapped face coatings that extend in strips around the slots. Because of the extension of the middle spacers 209 beyond the edges of the base sheets, the face coating strips take on a well defined molded shape. When the gaskets are pulled from the stack, the stretching and deformation of the edge coating material discussed relative to FIGS. 4 and 6 does not occur because the material on each edge is separated by the material on adjacent gaskets by the spacer 223. In this regard, the coating material may be allowed to thicken fully before the individual gaskets are peeled from the stack if desired since elongation of the coating material to define raised rims is not required. The result is a molded wrapped edge and face coating surrounding the seal enhancement zone slots that can be precisely dimensioned and shaped by selection of spacers having appropriate thicknesses. For example, if thinner face coatings are desired, then spacers 208 and 211 can be relatively thinner whereas relatively thicker spacers result in relatively thicker face coatings. The embodiment of the process shown in FIG. 5 is useful for producing gaskets with edge-coated slots in seal enhancement zones that have cleanly molded edges.

While three embodiments of the mold-in-place manufacturing process of the invention have been illustrated, it will be understood that numerous variations of the illustrated and described embodiments are possible. For example, a variety of thicknesses of spacers with a variety of sizes and shapes of seal enhancement zone slots may be used to form edge coatings with an equal variety of shapes and corresponding advantages. Thus, the exemplary embodiments described herein should not be considered exhaustive, but are provided only as examples of certain modes of practicing the invention.

The present invention also includes an engine, such as a diesel or gasoline engine used in vehicles, that incorporates one or more gaskets with seal enhancement zones having edge coated slots formed therein. The engine may be of any type and configuration well known in the automotive industry. The gaskets most likely are disposed between the block of the engine and attached components and primarily are used to seal against the leakage of fluid flowing past the gasketed junction. Such an engine is less prone to mechanical failures and inefficiencies due to fluid leakage or seal failure, since the seal enhancement zones of the gaskets provide enhanced seal functionality in selected regions where a less than complete seal otherwise might be formed.

The invention has been described herein in terms of preferred embodiments and methodologies that represent the best mode known to the inventors of carrying out the invention. It will be understood, however, that a wide variety of additions, deletions, and modifications might well be made to the illustrated embodiments by those of skill in the art without departing from the spirit and scope of the invention as set forth in the claims.

What is claimed is:

1. A gasket sized and shaped to be clamped between a pair of flanges having openings that align to form at least one fluid passageway that surround the opening and are disposed in face-to-face relationship when the flanges are clamped together, the gasket comprising:

a base sheet of gasket material having at least one aperture sized and positioned to align with the openings in the flanges for sealing around a fluid passageway and a web surrounding said aperture and disposed between the flange surfaces when said gasket is clamped between the flanges;

a seal enhancement zone at a selected location on said web, said seal enhancement zone being positioned to align between flanges surfaces at a location remote from the at least one fluid passageways when said gasket is clamped between the flanges;

a slot formed in said web within said seal enhancement zone, said slot being bounded by slot edges, the slot being positioned between the flanges such that no fluid flows within the slots;

an edge coating on said slot edges, said slot and said edge coating providing an enhanced seal between said flange surfaces within said seal enhancement zone at a location remoter from fluid passageways in the flanges.

2. The gasket of claim 1 and wherein said edge coating is formed from a polymeric material.

3. The gasket of claim 2 and wherein said polymeric material includes at least one polymer selected from acrylics, acrylonitriles, fluorcarbons, styrene butadienes, polyvinyl chlorides, chloroprenes, ethylene propylenes, ethylene/vinyl acetates, epoxides, fluorosilicones, polyurethanes, silicones and co-polymers and mixtures thereof.

4. The gasket of claim 1 and further comprising a plurality of said seal enhancement zones at a plurality of selected locations on said web.

5. The gasket of claim 1 and wherein said edge coating projects beyond at least one facial plane of said base sheet.

6. The gasket of claim 1 and wherein said edge coating substantially fills said slot.

7. The gasket of claim 1 and further comprising at least two bolt holes formed in said web.

8. The gasket of claim 7 and wherein said seal enhancement zone is located between said at least two bolt holes.

9. The gasket of claim 1 and wherein said base sheet is formed of a porous gasket material.

10. The gasket of claim 1 and wherein said edge coating penetrates said slot edge to form an intrusion zone.

11. The gasket of claim 1 and wherein said aperture is bounded by an interior edge having a coating thereon.

12. A gasket configured to be clamped between a pair of flanges having openings that align to form a fluid passageway and flange surfaces that align in face-to-face relationship when the flanges are clamped together, said gasket comprising a base sheet of gasket material formed with an aperture for alignment with the opening in the flanges to seal around the fluid passageway and a web for alignment between the face-to-face flange surfaces, said web being formed with a slot bounded by slot edges and being positioned on said web to be disposed between flange surfaces at a location remote from the fluid passageway, and an edge coating on said slot edges for establishing a seal between the flanges surfaces such that the slot is positioned between the flanges such that no fluid flows within the slots.

13. The gasket of claim 12 and wherein said edge coating is formed from a polymeric material.

14. The gasket of claim 13 and wherein said polymeric material includes at least one polymer selected from acrylics, acrylonitriles, fluorcarbons, styrene butadienes, polyvinyl chlorides, chloroprenes, ethylene propylenes, ethylene/vinyl acetates, epoxides, fluorosilicones, polyurethanes, silicones and co-polymers and mixtures thereof.

15. The gasket of claim 12 and further comprising a plurality of said slots at a plurality of selected locations on said web.

16. The gasket of claim 12 and wherein said edge coating projects beyond at least one facial plane of said base sheet.

17. The gasket of claim 12 and wherein said edge coating substantially fills said slot.

18. The gasket of claim 12 and further comprising at least two bolt holes formed in said web.

19. The gasket of claim 18 and wherein said slot is located between said at least two bolt holes.

20. The gasket of claim 12 and wherein said base sheet is formed of a porous gasket material.

21. The gasket of claim 12 and wherein said edge coating penetrates said slot edge to form an intrusion zone.

22. The gasket of claim 12 and wherein said aperture is bounded by an interior edge having a coating thereon.

* * * * *